(12) United States Patent
Busch et al.

(10) Patent No.: US 8,690,085 B2
(45) Date of Patent: Apr. 8, 2014

(54) IRRIGATION DEVICE

(75) Inventors: Peter Busch, Bjerringbro (DK); David Stuart, Lubbock, TX (US)

(73) Assignee: Grundfos Management a/s, Bjerringbro (DK)

( * ) Notice: Subject to any disclaimer, the term of this patent is extended or adjusted under 35 U.S.C. 154(b) by 171 days.

(21) Appl. No.: 13/087,516

(22) Filed: Apr. 15, 2011

(65) Prior Publication Data
US 2011/0253814 A1    Oct. 20, 2011

(30) Foreign Application Priority Data

Apr. 15, 2010  (EP) .................................. 10003986

(51) Int. Cl.
*B05B 3/00*    (2006.01)
(52) U.S. Cl.
USPC ............ 239/728; 239/723; 239/726; 239/729
(58) Field of Classification Search
USPC .................. 239/723, 724, 726, 728, 729, 742
See application file for complete search history.

(56) References Cited

U.S. PATENT DOCUMENTS

| | | | |
|---|---|---|---|
| 3,598,142 A | 8/1971 | Neier | |
| 4,195,781 A | 4/1980 | Scholz | |
| 6,928,339 B2 * | 8/2005 | Barker | 239/739 |
| 7,878,429 B2 * | 2/2011 | Parod et al. | 239/726 |
| 8,210,445 B2 * | 7/2012 | Coleman et al. | 239/728 |
| 2006/0283507 A1 | 12/2006 | Marcy | |

OTHER PUBLICATIONS

EP Search Report issued on Sep. 15, 2010 in EP Application No. 10 00 3986.

* cited by examiner

*Primary Examiner* — Steven J Ganey
(74) *Attorney, Agent, or Firm* — Panitch Schwarze Belisario & Nadel LLP

(57) ABSTRACT

An irrigation device includes a pipe conduit (2) which is connectable to a water source. An irrigation arm (10) is arranged at an end of the pipe conduit (2) which is away from the water source. The irrigation device also includes at least one pump (24) for delivering water from the water source to at least one sprinkler (22) formed on the irrigation arm (10). The at least one pump (24) is arranged within a connection conduit from the water source to the sprinkler (22). The connection conduit is formed by the pipe conduit (2) and the irrigation arm (10).

14 Claims, 3 Drawing Sheets

IRRIGATION DEVICE

BACKGROUND OF THE INVENTION

The present invention relates generally to an irrigation device and, more particularly, to an irrigation device including a pipe conduit connectable to a water source, an irrigation arm on an end of the pipe conduit which is away from the water source, and at least one pump for delivering water from the water source to at least one sprinkler formed on the irrigation arm.

Devices of this type are for example applied on agricultural land areas, in order to provide the plants which are grown there, with an adequate amount of water. Irrigation devices are known, which include an irrigation arm with preferably several sprinklers which are formed thereon and with which the plants are sprayed with water. The delivery of water from a water source to the sprinklers is effected via an external pump assembly. It is particularly with a stationary constructed irrigation device, that the pump unit, which is typically arranged next to the actual irrigation device, is subjected to significant wear due to the weather. Moreover, there is also the danger that the pump assemblies of the irrigation devices are the target of vandalism.

BRIEF SUMMARY OF THE INVENTION

Against this background, it is an objective of a preferred embodiment of the present invention to provide an irrigation device, with which a pump assembly of the device is better protected.

The above objective is achieved by an irrigation device including a pipe conduit connectable to a water source, an irrigation arm on an end of the pipe conduit which is away from the water source, and at least one pump for delivering water from the water source to at least one sprinkler formed on the irrigation arm. Advantageous further formations of this irrigation device are to be deduced from the subsequent description and the drawings. Hereby, according to a preferred embodiment of the present invention, the features specified in the dependent claims, in each case on their own or however also in combination, may further form the solution according to a preferred embodiment of the present invention.

The irrigation device according to a preferred embodiment of the present invention comprises a pipe conduit which may be connected to a water source. Hereby, a connection of the pipe conduit to the water source, as the case may be, is also to be understood as an immersion of a section of the pipe conduit into the water of the water source. The pipe conduit comprises at least one section which, proceeding from the surface of the set-up location of the irrigation device, extends obliquely or preferably perpendicularly upwards, so that an irrigation device which is arranged at the end of the pipe conduit which is away from the water source, is vertically distanced to the area to be irrigated.

An irrigation arm as an irrigation means is arranged at the end of this pipe conduit which is away from the water source. With regard to this irrigation arm, it is usefully likewise the case of a pipe conduit, on which at least one sprinkler is arranged. Hereby, in the context of a preferred embodiment of the present invention, a sprinkler in the simplest case is to be understood as a water exit opening which is formed on the irrigation arm and ranging to a water exit nozzle or any other designed water exit location.

At least one pump is provided for delivering the water from the water source to the at least one sprinkler arranged on the irrigation arm. According to a preferred embodiment of the present invention, this pump is arranged within the connection conduit from the water source to the sprinkler, said connection conduit being formed by the pipe conduit and the irrigation arm. Accordingly, the pump is surrounded completely by the outer wall of the pipe conduit or of the outer wall of the irrigation arm, and in this manner is protected from the outer surroundings of the irrigation device. Poor weather conditions thus have significantly less and, in the most favorable case, no influence on the pump. Moreover, due to the fact that it is not directly visible on account of its encapsulated arrangement in the conduit connection, the pump is also better protected from an unallowable manipulation or removal, which was possible in a simple manner with the irrigation devices known until now.

A further advantage of the arrangement of the pump, according to a preferred embodiment of the present invention, within the connection conduit from the water source to the at least one sprinkler, said conduit being formed by the pipe conduit and the irrigation arm, is to be seen in the fact that the outer wall of the pipe conduit or of the irrigation arm and surrounding the pump, may form an additional sound insulation of the pump, so that the operating noise of the pump, if it can be heard at all, may be perceived in a less disturbing manner.

Preferably, the pump is arranged within the pipe section of the pipe conduit which is adjacent to the water source. Accordingly, the arrangement of the pump in an essentially direct manner downstream of the water source is envisaged. The pump may be arranged in a horizontally running section of the pipe conduit as well as in a vertically directed section of the pipe conduit. A particularly good protection of the pump may be achieved if the pump is arranged in a section of the pipe conduit which is buried in the ground below the set-up location of the irrigation device, in a manner which is not visible from the outside. Alternatively, it may also be advantageous to arrange the pump in a freely accessible section of the pipe conduit, since this e.g. simplifies maintenance work which is to be carried out on the pump.

Advantageously, a second pump may be arranged within the irrigation arm. For example, a further pump may be arranged in the irrigation arm next to a pump arranged within the pipe conduit close to the water source. This design is particularly advantageous if the delivery path from the water source to the sprinkler arranged on the irrigation arm, or to the several sprinklers provided there, is comparatively long. In this case, the water may firstly be delivered with the pump arranged in the pipe conduit up to the pump arranged in the irrigation arm, and from there, by way of the latter pump, with an adequately high pressure, to the sprinkler or sprinklers and be sprayed out there. A further advantage of the use of two pumps lies in the fact that the two pumps in each case may have a lower power but also smaller dimensions compared to only one pump.

Preferably, with regard to the at least one pump of the irrigation device according to a preferred embodiment of the present invention, it is the case of a submersible pump. Particularly advantageously, a pump arranged within the pipe conduit and a pump arranged in the irrigation arm may in each case be a submersible pump. Advantageously, these pumps are cooled in each case by the water environment in the pipe conduit or in the irrigation arm. The applied submersible pumps are typically dimensioned in a manner such that they may be introduced into the inner lumen of the pipe conduit or into the inner lumen of the irrigation arm and may be fastened there. With the applied submersible pumps, it may be the case of submersible pumps with one impeller or with several impellers which are arranged one after the other, thus of a single-stage or multi-stage centrifugal pump.

The pumps which are applied within the pipe conduit and within the irrigation arm may also be those pumps which deliver the water of the water source, at a constant impeller rotational speed, to the sprinkler or to the sprinklers, which is or are arranged on the irrigation arm. Then, however, a pressure control valve is necessary in the conduit connection between the water source and the sprinkler or sprinklers which are arranged on the irrigation arm, in order to control the water pressure with a closed loop down to a constant value, for realizing a constant water pressure in the irrigation arm.

A design, with which one may make do without such a pressure control valve, is more advantageous. For this reason, one preferably envisages the at least one pump and preferably a pump arranged in the pipe conduit as well as a pump arranged in the irrigation arm, having a speed-controllable drive. Then, an electrical drive motor of the applied pump or pumps may be activated in a manner such that one may realize different impeller speeds of the pump(s). The control means, which are required for this, may be an integral constituent of the applied pump or pumps or they may be arranged in a control housing which is arranged outside the conduit connection which is between the water source and the sprinkler or sprinkles and which is formed by the pipe conduit and the irrigation arm.

The drive of the pumps is preferably controlled by way of a frequency converter. By way of this, a particularly power-effective and energy-saving pump operation with a uniform water throughput may be realized by way of the irrigation device in an advantageous manner.

Usefully, the connection conduit, from the water source to the sprinkler and which is formed by the pipe conduit and the irrigation arm, has at least one section which may be disassembled from the remaining connection conduit and in which the pump is arranged. Accordingly, a section of the pipe conduit and/or of the irrigation arm, in which a pump is arranged, may be separated from the remaining pipe conduit or from the remaining irrigation arm, which renders possible a simple maintenance of this pump or its simple exchange.

In order, with the removal of the disassemblable section, to prevent a flowing-out of water which is located in the sections of the connection conduit which are adjacent the disassemblable section, advantageously in each case a shut-off valve is arranged on these conduit sections which are adjacent the disassemblable section. This design permits the closure of the ends of the adjacent conduit sections which are free after the removal, with the shut-off valve, before the removal of the disassemblable section.

Preferably, the disassemblable section and the conduit sections, which are adjacent thereon, are connected by way of flange connections. Thus, in each case, a radially outwardly projecting, annular lug or flange may be formed on the two ends of the disassemblable section as well as on the free ends of the conduit sections adjacent thereto, wherein the disassemblable section and the adjacent conduit sections are screwed in the region of flanges which bear on one another in the assembly position of the disassemblable section and sections adjacent thereto.

It is particularly with the use of a speed-controlled pump that the irrigation device according to a preferred embodiment of the present invention may include a pressure sensor for detecting the water pressure prevailing at the exit side of the pump, the pressure sensor being signal-connected to the drive control of the pump. With regard to the pressure sensor, it may, for example, be the case of an absolute pressure sensor, or one may also apply differential pressure sensors. The impeller rotational speed of the drive motor of the pump or of the pumps may be controlled on the basis of the pressure value determined by the pressure sensor, such that the desired, preferably constant water pressure always prevails in the irrigation arm at the entry side of the sprinkler arranged there.

Moreover, it may also be advantageous to detect the water throughput through the irrigation arm. For this, at least one throughput sensor and preferably several throughput sensors, which are signal connected to a control device, may be arranged in the irrigation arm. Specially, if several sprinklers are arranged on the irrigation arm distributed over its length, then a throughput sensor may be arranged in the irrigation arm on the inflow side of each sprinkler, in order to detect with which water quantity the surface area assigned to each sprinkler is to be irrigated with.

Further advantageously, the water exit quantity of the sprinkler arranged on the irrigation arm may be individually controllable. For this, by way of a control, for example the cross sections of the water exit openings or water exit nozzles of the individual sprinkler may be changeable by way of a suitable activation of the sprinklers, wherein the water exit openings or the water exit nozzles may also be closed as the case may be. This design permits individual regions of an area to be irrigated with the irrigation device according to a preferred embodiment of the present invention, to be watered to a different extent. In each case, a control device may be assigned to each sprinkler for controlling the water exit quantity of the individual sprinklers, or a control device may be provided, with which the water exit quantity of all sprinklers may be controlled independently of one another. Preferably, one may provide a control device, with which the throughput sensors arranged in the irrigation arm are signal-connected, wherein the control device separately activates the individual sprinklers on the basis of the water throughput values detected by the individual throughput sensors.

With the irrigation device according to a preferred embodiment of the present invention, it may advantageously be the case of a circular area irrigation device. In this context, one preferably envisages the irrigation arm being rotatable about a vertical rotation axis, wherein the rotational speed of the irrigation arm may be controlled. For this, for example a control device may activate a drive motor for producing a rotational movement of the irrigation arm, preferably while taking into account the values determined by the throughput sensors and on the basis of the water quantity exiting at the individual sprinklers.

BRIEF DESCRIPTION OF THE SEVERAL VIEWS OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
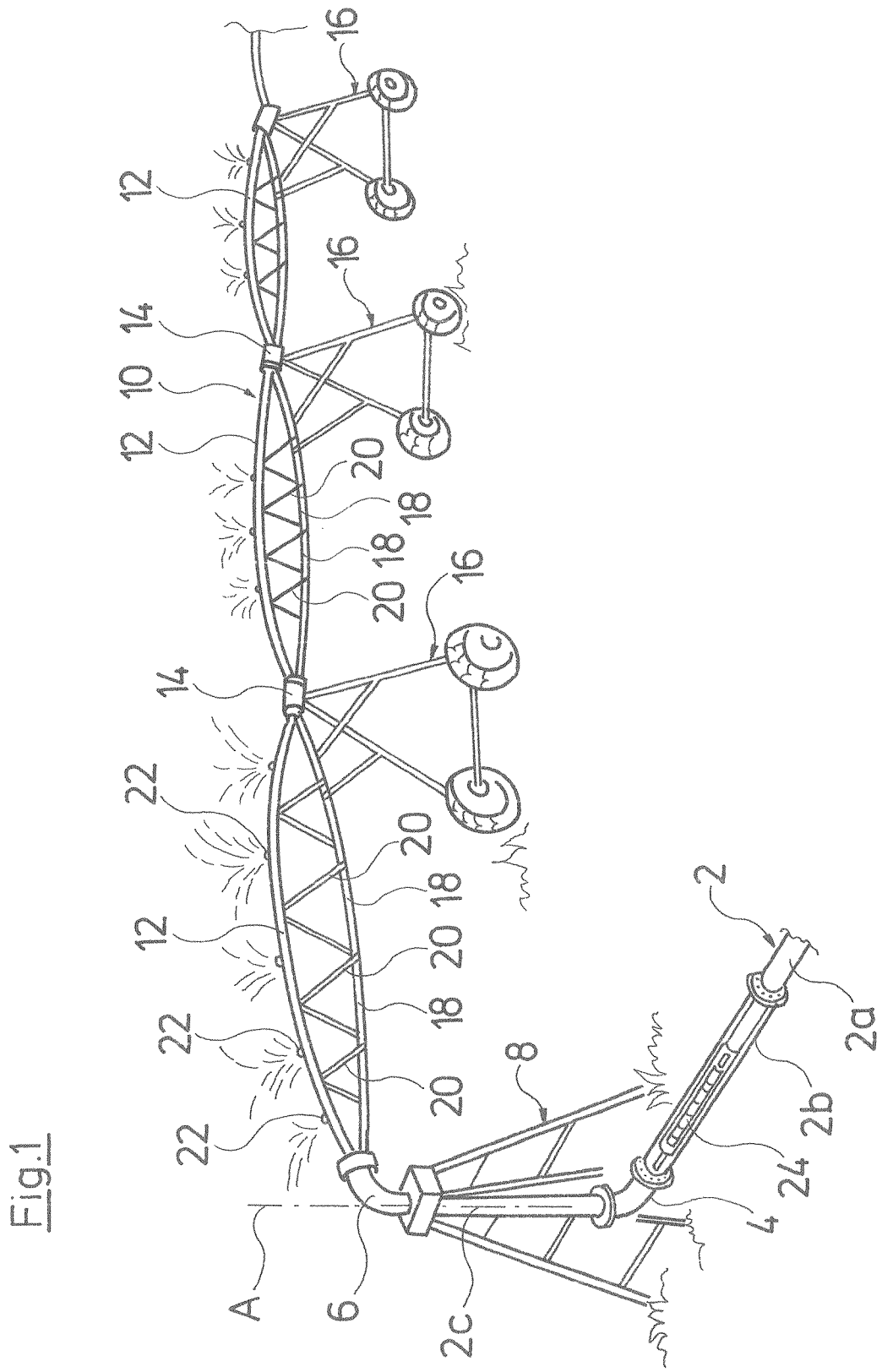
FIG. 1 is a schematic representation of a part of an irrigation device in accordance with a first preferred design of the present invention.

Certain terminology is used in the following description for convenience only and is not limiting. The word "outwardly" refers to a direction away from the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

With the irrigation devices represented in the drawing figures, it is the case of circular area irrigation devices, i.e. of irrigation devices, with which a circular area may be sprayed with water.

These irrigation devices in each case have a water source (not shown), such as a well, a canal or a pool, for example. A pipe conduit 2 is connected to the water source or immerses into this. The pipe conduit 2 preferably includes a pipe conduit section 2a which is directed essentially parallel to the surface of the set-up location of the irrigation device. A pipe conduit section 2b is connected to the pipe conduit section 2a via a flange connection. The pipe conduit section 2b extends coaxially to the pipe conduit section 2a, thus is likewise aligned essentially parallel to the surface of the set-up location of the irrigation device.

A pipe arch 4 is flanged on the end of the pipe conduit section 2b which is away from the pipe conduit section 2a, onto which pipe arch a pipe conduit section 2c connects, which is likewise fastened on the pipe arch 4 by way of a flange connection. The pipe conduit section 2c extends preferably essentially perpendicularly to the surface of the set-up location of the irrigation device. The pipe conduit section 2c is supported on a stand-like mount 6 in the region of its end which is away from the pipe arch 4 and on which a further pipe arch 6 connects.

The pipe arch 6 is pivotably, i.e. rotatably, mounted about a rotation axis A which is formed by the middle axis A of the pipe conduit section 2c, about an angular region of more that 360°. An irrigation arm 10 is connected at the end of the pipe arch 6 which is away from the pipe conduit section 2c. The basic alignment of this irrigation arm 10 is essentially parallel to the surface of the set-up location of the irrigation device. Typically, also the irrigation arm 12 together with the pipe arch 6 is pivotable, i.e. displaceable about the rotation axis A, about an angle of more than 360°.

The irrigation arm 10 preferably consists of several pipe conduit sections 12 which are connected to one another by way of coupling sleeves 14. The pipe conduit sections 12 have an arch-like curvature. In the region of the coupling sleeves 14, the irrigation arm 10 is supported via travel mounts 16 on the surface of the set-up location. The individual pipe conduit sections 12 are stabilized by way of truss-like support designs of longitudinal struts 18 and oblique struts 20.

Several nozzles 22, which communicate in a water-leading manner with the inner lumen of the pipe conduit sections 12, are arranged on the individual pipe conduit sections 12 of the irrigation arm 10, in each case on the peripheral surfaces of these pipe conduit sections. The nozzles 22 which are arranged in an essentially uniformly distanced manner on the pipe conduit sections 12 over their length, form sprinklers 22 of the irrigation device, with which the water of the water source may be sprayed by way of the irrigation device over a region to be watered.

A pump 24 is provided, in order to deliver the water of the water source via the connection conduit formed by the pipe conduit 2 and the irrigation arm 10, to the sprinklers 22. With regard to the pump 24 it is the case of a submersible pump 24 which is arranged within the pipe conduit section 2b of the pipe conduit 2. Due to this arrangement of the submersible pump 24, this is not directly accessible and is thus protected. On the other hand, the submersible pump 24 may be disassembled in a simple manner by way of releasing the flange connections of the pipe conduit section 2b to the pipe conduit section 2a and to the pipe arch 4, and then be overhauled or exchanged. Moreover, the arrangement of the submersible pump 24 in the pipe conduit section 2b, due to its cross-sectional dimensioning, is such that an annular gap which is filled with water, arises between the outer peripheral surface of the submersible pump 24 and the inner wall of the pipe conduit section 2b, which ensures a good removal of the heat produced by the pump.

In order to prevent water which is possibly located in the pipe arch 4 and the pipe conduit section 2a, from being able to run out when disassembling the pipe conduit section 2b with the submersible pump 24 located therein, the pipe conduit section 2a as well as the pipe arch 4 are designed in each case with a shut-off valve which is not shown in the drawing.

Figure 3:
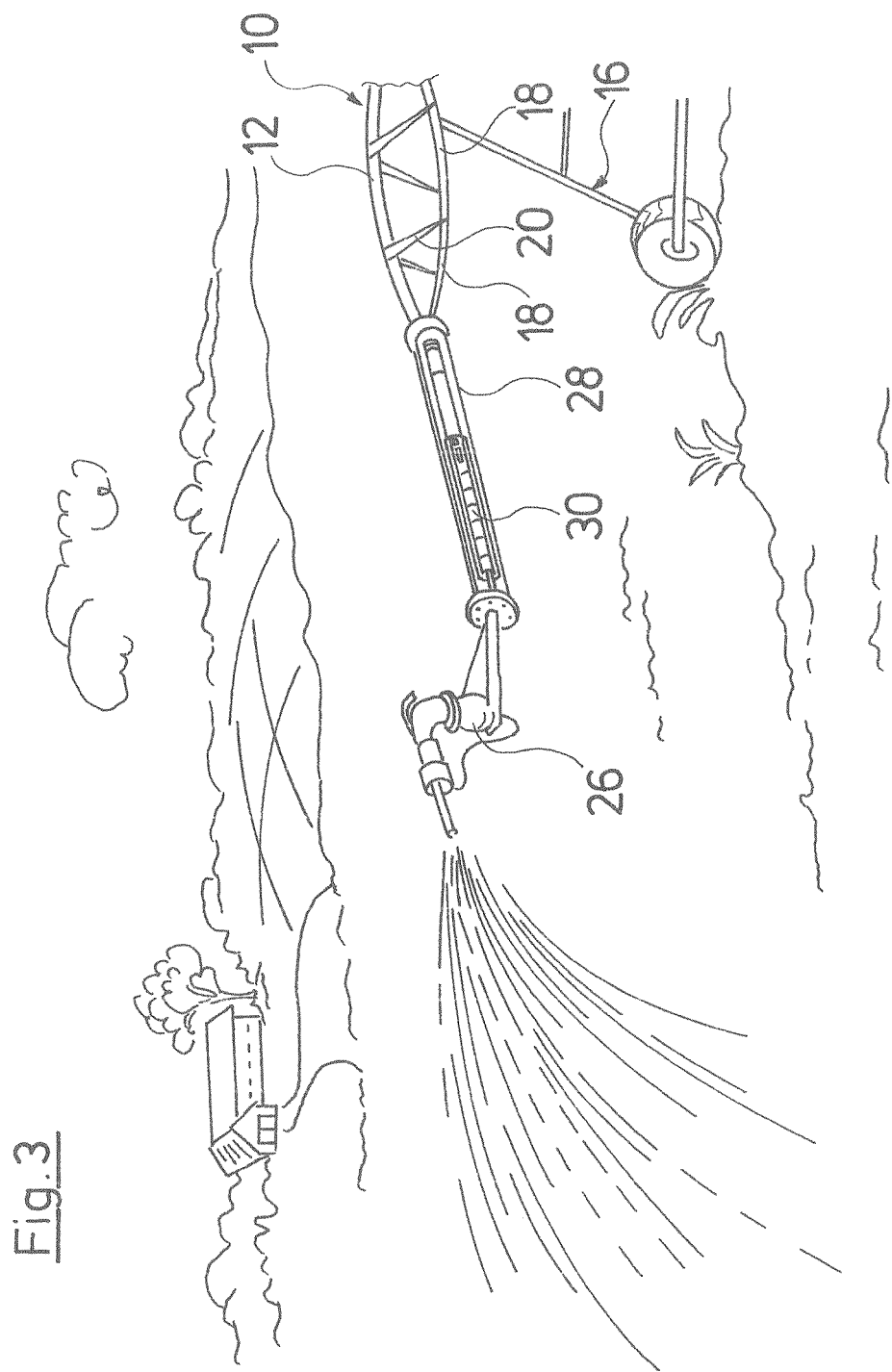
FIG. 3 is a schematic representation of a part of an irrigation device according to a third preferred design of the present invention.

With the irrigation device which is represented in FIG. 3, a sprinkler 26 in the form of a spray pistol 26 is arranged at the end of the irrigation arm 10 which is away from the pipe conduit 2. A pipe conduit section 28 is arranged on the entry side of the sprinkler 26, and the sprinkler 26 is fastened on this pipe conduit section by way of a further flange connection. The pipe conduit section 28 is a part of the irrigation arm 10 and, at the end which is away from the sprinkler 26, is flanged on a pipe conduit section 12. A further pump 30, with which it may also be the case of a submersible pump 30, is arranged within the pipe conduit section 28. The pump 30 may also be removed by way of a simple disassembly of the pipe conduit section, for overhaul or exchange purposes.

Figure 2:
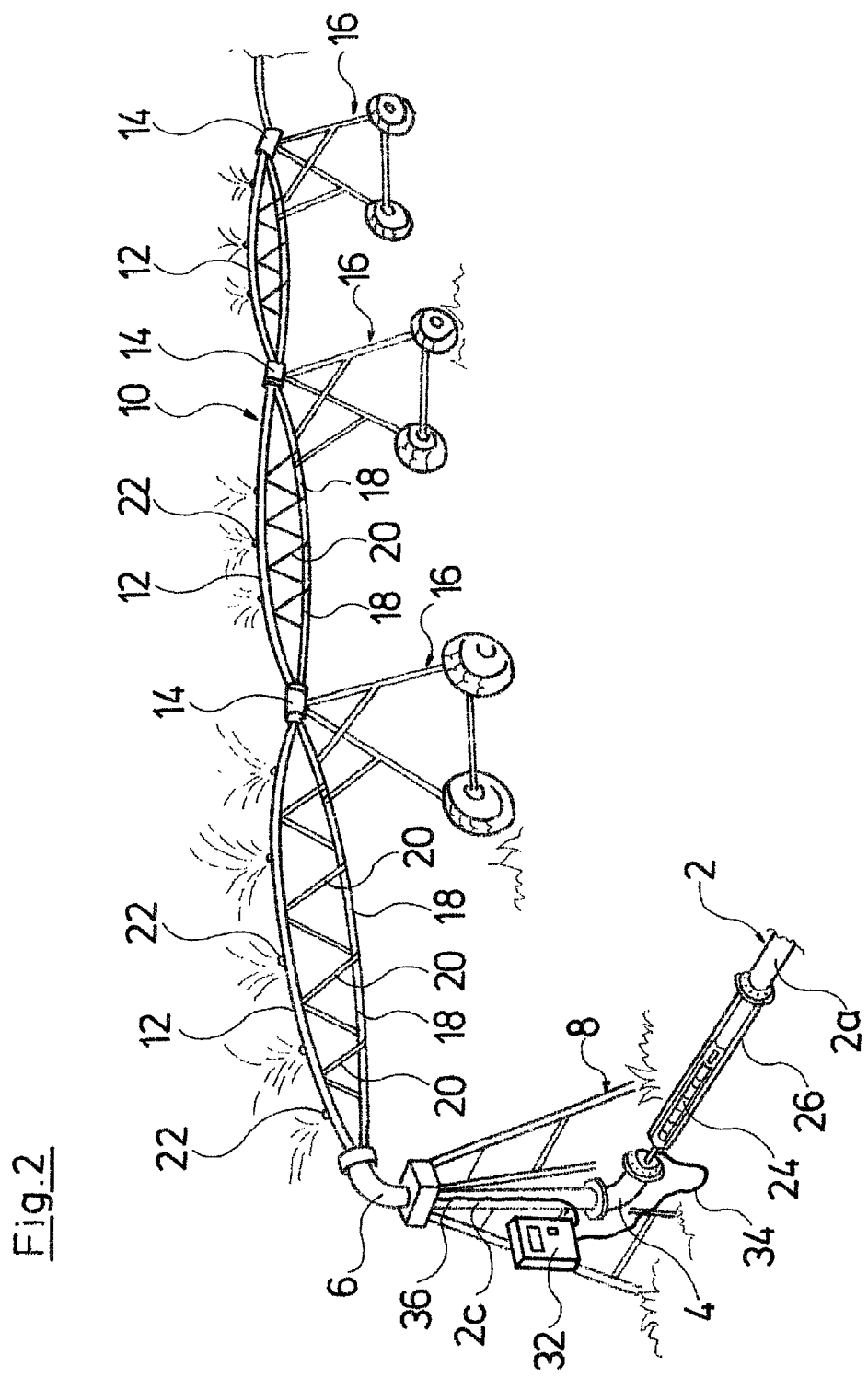
FIG. 2 is a schematic representation of a part of an irrigation device in a second preferred design of the present invention.

With the submersible pump 24 arranged within the pipe conduit section 2b, it is the case of such a submersible pump which has a speed-controllable drive. The control which is required for this is an integral constituent of the submersible pump 24, with the irrigation device represented by way of FIG. 1. In contrast to this, with the irrigation device represented in FIG. 2, an external control is provided, which is arranged in a control housing 32 fastened on the mount 8. An electrical supply and signal lead 34 leads from the control housing 32 through an opening formed in the pipe conduit section 2b, to the submersible pump 24. Moreover, a further electrical supply and signal lead 36 leads to a further submergible pump which is not shown in FIG. 2 and which is arranged in the irrigation arm 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An irrigation device comprising a pipe conduit (2) connectable to a water source, an irrigation arm (10) on an end of the pipe conduit which is away from the water source, and at least one pump (24, 30) for delivering water from the water source to at least one sprinkler (22, 26) formed on the irrigation arm (10), the at least one pump (24, 30) being arranged within a connection conduit from the water source to the at least one sprinkler (22, 26), said connection conduit being formed by the pipe conduit (2) and the irrigation arm (10) and comprising at least one section which ma be disassembled from the remaining connection conduit and in which the pump (24, 30) is arranged.

2. The irrigation device according to claim 1, wherein the at least one pump (24) is arranged within the pipe conduit (2).

3. The irrigation device according to claim 2, wherein a second pump (30) is arranged within the irrigation arm (10).

4. The irrigation device according to claim 1, wherein the at least one pump (24, 30) is a submersible pump (24, 30).

5. The irrigation device according to claim 1, wherein the at least one pump (24, 30) has a speed-controllable drive.

6. The irrigation device according to claim 5, wherein the drive of the at least one pump (24, 30) is controlled by way of a frequency converter.

7. The irrigation device according to claim 1, wherein in each case a shut-off valve is arranged on the conduit sections which are adjacent to the disassemblable section.

8. The irrigation device according to claim 1, wherein the disassemblable section and the conduit sections, which are adjacent thereto, are connected by way of flange connections.

9. The irrigation device according to claim 1, further comprising a pressure sensor for detecting water pressure prevailing at an exit side of the pump, and which is signal-connected to a drive control of the pump.

10. The irrigation device according to claim 1, wherein at least one throughput sensor, which is signal connected to a control device, is arranged in the irrigation arm (10).

11. The irrigation device according to claim 1, wherein a water exit quantity of the at least one sprinkler (22, 26) arranged on the irrigation arm (10) may be individually controlled.

12. The irrigation device according to claim 1, wherein the irrigation arm (10) is rotatable about a vertical rotation axis (A), wherein the rotational speed of the irrigation arm (10) may be controlled.

13. The irrigation device according to claim 1, wherein the at least one pump (24, 30) is completely surrounded by an outer wall of the pipe conduit (2) or an outer wall of the irrigation arm (10).

14. An irrigation device comprising:
 a pipe conduit (2) including a first pipe conduit section (2*a*) connectable to a water source, a second pipe conduit section (2*b*) fixedly connected to the first pipe conduit section (2*a*) by a flange connection, and a third pipe conduit section (2*c*) fixedly connected to the second pipe conduit section (2*b*) by a first pipe arch (4), the third pipe conduit section (2*c*) being connected to a second pipe arch (6);
 an irrigation arm (10) connected to the second pipe arch (6), at least one sprinkler (22, 26) formed on the irrigation arm (10); and
 at least one pump (24, 30) for delivering water from the water source to the sprinkler (22, 26), the at least one pump (24, 30) being arranged within one of the pipe conduit (2) and the irrigation arm (10).

* * * * *